United States Patent Office 2,721,193
Patented Oct. 18, 1955

2,721,193

PENICILLIN SALT OF N-(β-CHLORO-β-PHENETHYL)-PIPERIDINE

Frank H. Buckwalter, Dewitt, and Alphonse P. Granatek, Syracuse, N. Y., assignors to Bristol Laboratories Inc., Syracuse, N. Y., a corporation of New York No Drawing. Application March 13, 1952, Serial No. 276,452

2 Claims. (Cl. 260—239.1)

The present invention relates to a new, non-toxic, water-insoluble, amine salt of penicillin, more particularly a penicillin salt of N-(β-chloro-β-phenethyl)-piperidine, which is capable of exerting a repository antibiotic action and is also useful for oral, therapeutic administration and for external application and for use as a supplement in animal and poultry feeds.

The new penicillin salt of the present invention has the following formula

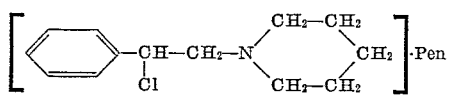

wherein Pen designates an acid penicillin radical or an active moiety thereof, capable of forming an addition salt with N-(β-chloro-β-phenethyl)-piperidine.

The product of the present invention may be obtained by reaction of penicillin acid with N-(β-chloro-β-phenethyl)-piperidine in a water-immiscible organic solvent and by the metathetical reaction of a water-soluble penicillin salt and a water-soluble salt of N-(β-chloro-β-phenethyl)-piperidine in water.

A more comprehensive understanding of this invention is obtained by reference to the following examples.

EXAMPLE I

N-(β-chloro-β-phenethyl)-piperidine hydrochloride)

A solution of 30.8 g. (0.15 mole) of N-(β-hydroxy-β-phenethyl)-piperidine of M. P. 71.0–72.5° C. in 150 cc. ether is added dropwise to an ice-cold, stirred solution of 23.8 g. (0.20 mole) of thionyl chloride in 50 cc. ether. Yellow, gummy material separates at once and is collected by filtration and recrystallized several times from isopropanol containing a little water to give white, crystalline N-(beta-chloro-beta-phenethyl)-piperidine melting at about 171.0°–171.5° C.

Analysis.—Calculated for $C_{13}H_{19}NCl_2$: C, 60.00; H, 7.36; N, 5.38. Found: C, 59.7; H, 7.68; N, 5.21.

EXAMPLE II

Penicillin G salt of N-(β-chloro-β-phenethyl)-piperidine 0.141 gram of N-(beta-chloro-beta-phenethyl)-piperidine hydrochloride in 0.7 cc. water is added to 0.198 gram of sodium penicillin G in 6 cc. water. Upon scratching and cooling, the crystalline penicillin G salt of N-(beta-chloro-beta-phenethyl)-piperidine precipitates and is collected by filtration. This salt has a potency of about 1075 units/mgm. and is soluble in water at room temperature to the extent of about 1000 units/cc.

EXAMPLE III 1.0 gram of N-(beta-chloro-beta-phenethyl)-piperidine hydrochloride in 5.0 cc. water is added to 1.4 grams of sodium penicillin G in 42.4 cc. water. Upon scratching and cooling, the crystalline penicillin G salt of N-(beta-chloro-beta-phenethyl)-piperidine precipitates and is collected by filtration. This salt has a potency of about 1075 units/mgm. and is soluble in water to the extent of about 1000 units/cc.

EXAMPLE IV

Potassium penicillin G (18.6 grams; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (8.9 grams) of freshly liberated N-(β-chloro-β-phenethyl)-piperidine in 50 ml. of ether. Crystalline penicillin G salt of N-(β-chloro-β-phenethyl)-piperidine precipitates and is collected by filtration.

While the present invention has been described with particular reference to the N-(β-chloro-β-phenethyl)-piperidine salt of penicillin G it will be understood that the N-(β-chloro-β-phenethyl)-piperidine salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride, phosphate, nitrate, hydrobromide, sulfate, citrate, acetate and tartrate.

It will be understood that, without departing from the spirit of the invention or the scope of the claims, various modifications may be made in the specific expedients described as these are illustrative only.

We claim:

1. A salt of penicillin and N-(β-chloro-β-phenethyl)-piperidine.

2. A salt of penicillin G and N-(β-chloro-β-phenethyl)-piperidine.

References Cited in the file of this patent

UNITED STATES PATENTS

| | | |
|---|---|---|
| 2,547,640 | Goldman | Apr. 3, 1951 |
| 2,578,641 | Cooper | Dec. 11, 1951 |
| 2,598,508 | Cooper | May 27, 1952 |
| 2,654,746 | Rhodehamel | Oct. 6, 1953 |